United States Patent [19]
Kim et al.

[11] 4,223,104
[45] Sep. 16, 1980

[54] COPOLY (CARBONATE/PHOSPHONATE) COMPOSITIONS

[75] Inventors: Ki-Soo Kim, Irvington, N.Y.; Arthur J. Yu, Stamford, Conn.; Siegfried Altscher, Monsey, N.Y.

[73] Assignee: Stauffer Chemical Company, Westport, Conn.

[21] Appl. No.: 932,840

[22] Filed: Aug. 11, 1978

[51] Int. Cl.² ............................................. C08G 63/62
[52] U.S. Cl. .................................... 528/169; 525/462; 525/465; 528/174; 528/196; 528/202; 528/204; 528/219
[58] Field of Search ............... 528/169, 196, 202, 129, 528/155, 174, 199; 525/465

[56] References Cited

U.S. PATENT DOCUMENTS

| | | | |
|---|---|---|---|
| 3,094,508 | 6/1963 | Butterworth et al. | 260/47 |
| 3,578,634 | 5/1971 | Bialous | 528/169 |
| 3,766,139 | 10/1973 | Bialous | 260/47 X |
| 3,897,392 | 7/1975 | Haupt et al. | 528/169 |
| 4,001,183 | 1/1977 | Freitag | 528/196 |

FOREIGN PATENT DOCUMENTS 1025422  4/1966  United Kingdom ..................... 528/169

*Primary Examiner*—Theodore E. Pertilla
*Attorney, Agent, or Firm*—Richard P. Fennelly

[57] ABSTRACT

Improved copoly(carbonate/phosphonate) compositions formed by reaction of a dihydric phenol, a carbonate precursor, and an organophosphorus dihalide are disclosed. The inherent viscosity and melting point of such compositions is increased by the presence of an effective amount of a chain branching agent, optionally in the additional presence of a chain terminating agent.

12 Claims, No Drawings

COPOLY (CARBONATE/PHOSPHONATE) COMPOSITIONS

BACKGROUND OF THE INVENTION

1. Field of the Invention

The present invention relates to improved copoly(carbonate/phosphonate) compositions which are useful thermoplastic materials for forming molded and shaped articles.

2. Description of the Prior Art

Polycarbonate resins are a well-known type of engineering thermoplastic formed by condensation polymerization of a dihydric phenol, such as, bisphenol A, and a carbonate precursor, such as, phosgene. They are useful in the formation of molded and shaped articles having good impact resistance and strength. It is also known to include an organophosphorus dihalide as a third major monomeric reactant in the reaction medium to form copoly(carbonate/phosphonate) compositions. In such compositions, the basic polycarbonate structure is modified by the presence of phosphonate structures derived from the organophosphorus dihalide reactant, and this phosphonate structure contributes to the flame retardancy of the resulting polymer. Representative copoly(carbonate/phosphonate) compositions that are known to the prior art are described in the following patents and publications: Belgian Pat. No. 610,954; British Pat. No. 1,031,481; U.S. Pat. No. 3,378,523; U.S.S.R. Pat. No. 180,336; Soobshch. Akad. Nauk Gruz. SSR, 1971, 61(2), 317–319; and Vysokomol. Soedin., Ser. B 1970, 12(5), 384–387.

Although the additional presence of the organophosphorus dihalide contributes to giving greater flame retardancy to the resulting polymer, as compared to conventional two-component polycarbonates, such compounds, when used as a third monomeric reactant, tend to result in a decrease in the melting point and inherent viscosity of the resulting copoly(carbonate/phosphonate) composition as compared to a two-component polycarbonate not containing the organophosphorus dihalide. Reduction of the melting point and inherent viscosity is undesired since it detracts from the desired toughness of the endproduct.

SUMMARY OF THE PRESENT INVENTION

The present invention is an improved copoly(carbonate/phosphonate) composition having an increased melting point and inherent viscosity as compared to copoly(carbonate/phosphonate) compositions known to the prior art. The increased melting point and inherent viscosity of the compositions of the present invention is due to the presence therein of an effective amount for such effects of a chain branching agent. If desired, an effective amount of a chain terminating agent can also be included, at higher levels of addition of the chain branching agent, to retard the gelation of the polymer composition that would normally be caused by such higher levels of chain branching agents.

DETAILED DESCRIPTION OF PREFERRED EMBODIMENTS

The conventional copoly(carbonate/phosphonate) composition which the present invention is intended to improve is formed by the reaction of: (1) at least one dihydric phenol; (2) at least one carbonate precursor; and (3) at least one organophosphorus dihalide. The respective molar ratio of dihydric phenol to the combined amounts of carbonate precursor and organophosphorus dihalide will generally range from about 0.8:1 to about 1:0.8. The molar ratio of carbonate precursor to organophosphorus dihalide will generally range from about 0.01:1 to about 1:0.01.

The terminology "dihydric phenol" is intended to encompass those phenols which are useful in making polycarbonate resins. A representative listing of such phenols would include the following compounds: bisphenols, such as bis(4-hydroxyphenyl)methane, 2,2-bis(4-hydroxyphenyl)propane ("bisphenol A"), 2,2-bis(4-hydroxy-3-methylphenyl)propane, 4,4-bis(4-hydroxyphenyl)heptane, 2,2-bis(4-hydroxy-3,5-dichlorophenyl)propane ("tetrachlorobisphenol-A"), 2,2-bis(4-hydroxy-3,5-dibromophenyl)propane, 1,1-bis-4-hydroxyphenyl cyclohexane, etc.; dihydric phenol ethers, such as bis(4-hydroxy phenyl)ether, bis(3,5-dichloro-4-hydroxylphenyl)ether, etc., dihydroxydiphenyls, such as p,p'-dihydroxydiphenyl, 3,3'-dichloro-4,4'-dihydroxydiphenyl, etc.; dihydroxyaryl sulfones, such as bis(4-hydroxyphenyl)sulfone ("sulfonyldiphenol"), bis(3,5-dimethyl-4-hydroxyphenyl)sulfone, etc.; dihydroxyl benzenes, resorcinol, hydroquinone; halo- and alkyl-substituted dihydroxy benzenes, such as 1,4-dihydroxy-2-chlorobenzene, 1,4-dihydroxy-2,5-dichlorobenzene, 1,4-dihydroxy-3-methylbenzene, etc.; and the dihydroxy diphenyl sulfoxides and sulfides, such as bis(4-hydroxyphenyl)sulfoxide, bis-(3,5-dibromo-4-hydroxylphenyl)sulfoxide; bis(4-hydroxyphenyl)sulfide, and bis-3,5-dibromo-4-hydroxyphenyl)sulfide, etc.

The terminology "carbonate precursor" is intended to encompass those carbonate precursors conventionally used to form polycarbonate resins which can be either a carbonyl halide or a bishaloformate. The carbonyl halides include carbonyl chloride or phosgene (which is preferred), carbonyl bromide, and mixtures thereof. The bishaloformates of dihydric phenols (bischloroformates of hydroquinone, etc.) or glycols (bishaloformates of ethylene glycol, neopentyl glycol, polyethylene glycol, etc.) are representative of compounds of that type which can be used.

The term "organophosphorus dihalides" is intended to encompass compounds of the formulae $RP(O)X_2$ and $RPX_2$, where R is independently $C_1$–$C_{12}$ alkyl, phenyl, and halo-substituted phenyl, and X is independently chlorine or bromine. Representative organophosphorus dihalides include benzene phosphorus oxydichloride and methyl phosphorus oxydichloride.

The reaction for preparing such resins is conventionally conducted in the presence of an acid acceptor to remove byproduct hydrochloric acid and is advantageously carried out in an inert organic solvent reaction medium.

The reaction mixtures of the present invention differ from the prior art copoly(carbonate/phosphonate) compositions by the additional presence in the reaction medium (and in the resulting polymer product) of an effective amount of a chain branching agent. This additional component of the polymer is effective in raising the melting point and inherent viscosity of the resulting four-component polymer composition of the present invention as compared to the corresponding values of the prior art three-component copoly(carbonate/phosphonate) compositions not containing the chain branching agent. More than one chain branching agent can be used.

Representative chain branching agents which are useful in the practice of the present invention include the following types of compounds:

(a) trifunctional phosphorus compounds of the formulae:

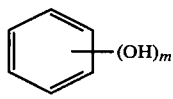

(1) $\overset{\overset{O}{\|}}{P}X_3$;

(2) $\overset{\overset{S}{\|}}{P}X_3$; and (3) $PX_3$ where X is independently chlorine and bromine. Phosphorus oxychloride ($POCl_3$) is a representative chain branching agent from this class of compounds; and (b) polyhydroxy compounds of the formula

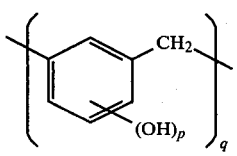

where m is an integer ranging from 3 to 6. Representative compounds of this type include phloroglucinol and pyrogallol.

(c) adducts of compound type (b) with formaldehyde to give compounds of the general formula $$\left(\underset{(OH)_p}{\overset{CH_2}{\bigodot}}\right)_q$$

where p is an integer of from 1 to 4 and q is an integer of from 2 to 8.

The amount of chain branching agent that needs to be used to give the desired increase in melting point and inherent viscosity for the copoly(carbonate/phosphonate) compositions of the present invention is rather small in comparison to the bisphenol and carbonate precursor reactants. If expressed in terms of mole % (based on the total molar amount of the bisphenol reactant or reactants), the mole % of the chain branching agent can vary from about 0.1 mole % to about 2 mole %, if used alone. The use of higher levels, which ordinarily would not be desired for economic considerations, will tend to cause undesired gelation of the polymer product due to excessive chain branching.

If it is desired to increase the level of chain branching agents to higher levels than set forth above, for example, to about 5 mole %, an effective amount of a chain terminator compound might also be added. Generally, such a chain terminator can be present at from about 0.1 mole % to about 10 mole %, based on the total molar amount of the phenol reactant or reactants. Representative chain terminators include the monohydroxy alkyl and aryl chain terminators conventionally employed in polycarbonate manufacture including: phenol, cresol, xylenol, p-tert-butylphenol, p-bromophenol, and the like.

The copoly(carbonate/phosphonates) are made via conventional procedures for making polycarbonate resins (e.g., reaction in inert solvent in the presence of an acid acceptor) and are processed using conventional fabrication techniques.

The present invention is further illustrated by the following Examples.

EXAMPLE 1

This Example illustrates the synthesis of a copoly(carbonate/phosphonate) in accordance with the present invention from a 75/25 molar percentage mixture of bisphenol A and sulfonyl diphenol.

Bisphenol A (91.2 gm.), sulfonyl diphenol (33.0 gm.), and triethylamine (120 gm.) were placed in a reaction flask in 1000 ml. of methylene chloride. To this mixture was added, with stirring, a mixture of benzene phosphorus oxydichloride (39.2 gm.), phosphorus oxychloride (0.80 gm.) and 100 ml. of methylene chloride. Phosgene gas (37 gm.) was then added over a one hour period. At the end of the addition of the phosgene, the polymer solution became very viscous, and 100 ml. of methylene chloride was added to dilute this viscous polymer solution. The reaction mixture was then washed with an equal volume of dilute hydrochloric acid and water three times, and the polymer product was recovered by precipitation in methanol antisolvent.

The product had a phosphorus content of about 4%, by weight, an inherent viscosity (as a 1% wt. soln. in a 60/40 weight ratio of phenol and tetrachloroethane at 30° C.) of 0.95, and a melting point of about 255° C. The product, when melt pressed at about 215.6° C. under a pressure of about 2109.3 kg./cm.$^2$, was clear.

EXAMPLE 2

This Example illustrates the synthesis of a copoly(carbonate/phosphonate) similar to the one of Example 1 with the exception that a 50/50 molar percentage of bisphenol A and sulfonyl diphenol was used.

The same synthesis procedure described in Example 1 was employed with the exception that 60.8 gm. of bisphenol A and 66.0 gm. of sulfonyl diphenol were used.

The product had a phosphorus content of about 4%, by weight, an inherent viscosity of 0.87, and a melting point of about 270° C. The product, when melt pressed, was clear.

EXAMPLE 3

This Example illustrates the synthesis of a copoly(carbonate/phosphonate) similar to the one of Example 1 with the exception that only sulfonyl diphenol was used as the diphenol component.

The same synthesis procedure described in Example 1 was employed with the exception that 134 gm. of sulfonyl diphenol was used, and the amount of phosgene that was added was 39 gm.

The product had a phosphorus content of about 4% by weight, an inherent viscosity of 0.52, and a melting point of about 275° C. The product, when melt pressed, was clear.

EXAMPLE 4

This Example illustrates the synthesis of a copolymer(carbonate/phosphonate) similar to the one of Example 1 with the exception that only Bisphenol A was used as the diphenol component.

The same synthesis procedure described in Example 1 was employed with the exception that 121.6 gm. of Bisphenol A was used, and the amount of phosgene that was added was 39 gm.

The product had a phosphorus content of about 4%, by weight, an inherent viscosity of 0.58, and a melting point of about 235° C. The melt pressed film made from this product was clear.

EXAMPLE 5

This Example sets forth some of the pertinent physical properties for the products of Example Nos. 1, 2 and 4. No data is presented for the product of Example 3 since it shattered in the mold during sample preparation. Standard test procedures were used. The abbreviation "B/Y" indicates that the sample broke without yielding.

| Example No. | Tensile Strength | |
| --- | --- | --- |
| | Yield (kg./cm.$^2$) | Break (kg./cm.$^2$) |
| 1 | B/Y | 60.47 |
| 2 | B/Y | 140.62 |
| 4 | B/Y | 361.4 |

| Example No. | Elongation | | Tensile Impact (Newton-meter/cm.$^2$) |
| --- | --- | --- | --- |
| | Yield (%) | Break (%) | |
| 1 | B/Y | 0.7 | 0.42 |
| 2 | B/Y | 1.6 | 0.63 |
| 4 | B/Y | 3 | 2.52 |

| Example No. | Flexural Modulus (kg./cm.$^2$ × 10$^{-4}$) | DTL (°C.) | LOI | UL-94 |
| --- | --- | --- | --- | --- |
| 1 | 2.20 | 114 | 37 | V-O |
| 2 | 2.62 | 140 | 36 | V-O |
| 4 | 2.85 | 112 | 35 | V-O |

The data indicate that the phosphorus containing copolymers had good flame retardancy (as indicated by the Underwriter Laboratory 94 test, where V-O indicates that the sample is self-extinguishing within 5 seconds when vertically held and no flaming drippings ignite cotton held below the sample). In general, a higher heat distortion temperature (DTL) was obtained by increasing the content of the sulfonyl diphenol in the polymer.

EXAMPLE 6

This Example illustrates the formation of a copoly(-carbonate/phosphonate) in accordance with the present invention wherein benzene phosphorus oxydichloride and 2 mole % (based on the amount of bisphenols) of phosphorus oxychloride were used. A 75%/25% ratio (on a molar basis) of bisphenol A and tetrachlorobisphenol was used.

Tetrachlorobisphenol A (45.7 gm.), bisphenol A (b 85.5 gm.) and triethylamine (200 ml.) were placed in 1000 ml. of methylene chloride in a reaction flask. To this mixture was added benzene phosphorus oxydichloride (19.5 gm.) and phosphorus oxychloride (1.5 gm. in 50 ml. of methylene chloride). Phosgene (42.3 gm.) was then added to the mixture of the previously described reactants over a 1 hour period to obtain a viscous polymer solution, and 200 ml. of methylene chloride was added at the end of the reaction to dilute the viscous solution. The reaction mixture was washed three times with equal volumes of hydrochloric acid and water, and the polymer product was recovered by precipitation in antisolvent methanol.

The product had an inherent viscosity (1 wt. % in a 40/60 weight mixture of tetrachloroethane and phenol at 30° C.) of 0.73 and a melting point of about 230°–240° C.

EXAMPLE 7

This Example illustrates formation of a copoly(carbonate/phosphonate) similar to the one formed in Example 6 differing by having an 80%/20% ratio (on a molar basis) of bisphenol A to tetrachlorobisphenol A.

The same general procedure of Example 6 was employed with the exception that 94.2 gm. of bisphenol A was used, 37.6 gm. of tetrachlorobisphenol A was used, 900 ml. of methylene chloride was used to dissolve the bisphenols, 44 gm. of phosgene was added, and 300 ml. of methylene chloride was added at the end of the reaction.

The product had an intrinsic viscosity of 0.63 and a melting point of about 225°–230° C.

EXAMPLE 8

This Example illustrates formation of a copoly(carbonate/phosphonate) similar to the one formed in Example 7 containing methyl phosphorus oxydichloride.

The same procedure used in Example 7 was employed with the exception that 98 gm. of bisphenol A, 39.3 gm. of tetrachlorobisphenol A, 220 ml. of triethylamine, and 900 ml. of methylene chloride to dissolve the foregoing reactants was used. The amount of methyl phosphorus oxydichloride which was used was 13.3 gm., and 1.8 gm. of phosphorus oxychloride was employed. The amount of phosgene that was used was 49 gm., and 300 ml. of methylene chloride was added at the end of the reaction.

The product had an intrinsic viscosity of 0.68 and a melting point of about 230°–240° C.

EXAMPLE 9

This Example illustrates some of the pertinent physical properties of the products of Examples 6–8. Standard test procedures were used:

| Example No. | Tensile Str. at Break (kg./cm.$^2$) | Elongation at Break (%) | Tensile Impact (Newton-meter/cm$^2$) |
| --- | --- | --- | --- |
| 6 | 69.19 | 1 | 0.84 |
| 7 | 217.69 | 3 | 0.42 |
| 8 | 112.5 | 1 | 0.84 |

| Example No. | Flexural Modulus (kg./cm.$^2$ × 10$^{-4}$) | DTL (°C.) | LOI (% O$_2$) | UL-94 |
| --- | --- | --- | --- | --- |
| 6 | 2.25 | 125 | 48 | V-O |
| 7 | 2.39 | 120 | 46 | V-O |
| 8 | 1.97 | 102 | 49 | V-O |

Copolymers containing either methyl phosphorus oxydichloride or benzene phosphorus oxydichloride showed good flame retardancy.

EXAMPLE 10

This Example illustrates formation of a copoly(carbonate/phosphonate) containing bisphenol A, as the phenol, and phosphorus oxychloride as the chain branching agent in the form of a copolymer wherein relatively short carbonate and phosphonate segments are randomly distributed in the polymer chain.

Bisphenol A (130 gm.) and triethylamine (132 gm.) were placed in a reaction vessel in 800 ml. of methylene chloride. To this mixture was then added benzene phosphorus oxydichloride (19.6 gm.) and phosphorus oxychloride (0.8 gm.) dissolved in 50 ml. of methylene chloride. Phosgene (53 gm.) was then added, and the product was recovered as described previously.

The product had a melting point of about 230° C. and an inherent viscosity of 0.59.

EXAMPLE 11

This Example illustrates formation of a copoly(carbonate/phosphonate) containing bisphenol A as the phenol and phosphorus oxytrichloride as the chain branching agent in the form of a copolymer wherein relatively long carbonate and phosphonate segments are distributed in the copolymer chain.

Bisphenol A (24.0 gm.) and triethylamine (25 gm.) were placed in 150 ml. of methylene chloride in a reaction flask. To this mixture was added benzene phosphorus oxydichloride (19.6 gm.) and phosphorus oxychloride (0.8 gm.) in 50 ml. of methylene chloride. To the viscous solution that resulted was then added 600 ml. of methylene chloride.

To the solution resulting from the aforementioned step was added additional bisphenol A (106 gm.) and triethylamine (110 gm.) in 100 ml. of methylene chloride. Then phosgene (57 gm.) was passed through the solution. A viscous solution resulted to which was added 200 ml. of methylene chloride. The product was recovered as previously described.

The product had a melting point of about 200° C. and an inherent viscosity of 0.74.

EXAMPLE 12

This Example illustrates synthesis of a copoly(carbonate/phosphonate) formed from 90% bisphenol A and 10% tetrachlorobisphenol A, as the phenols, and phosphorus oxychloride as the chain branching agent in the form of a copolymer analogous to that formed in Example 10.

Bisphenol A (115 gm.), tetrachlorobisphenol A (20 gm.), triethylamine (210 ml.) and methylene chloride (800 ml.) were placed in a reactor flask. To this mixture was added benzene phosphorus oxydichloride (9.75 gm.) and phosphorus oxychloride (0.83 gm.). Phosgene (55 gm.) was then added. To the viscous solution that resulted was added 200 ml. of methylene chloride. The product was recovered as previously described.

The product had a melting point of about 240° C. and an inherent viscosity of 0.63.

EXAMPLE 13

This Example illustrates synthesis of a copoly(carbonate/phosphonate) formed from 90% bisphenol A and 10% tetrachlorobisphenol A as the phenols and phosphorus oxytrichloride as the chain branching agent in the form of a copolymer analogous to that formed in Example 11.

Tetrachlorobisphenol A (20.5 gm.), triethylamine (35 ml.) and methylene chloride (150 ml.) were added to a reaction flask. To this mixture was added benzene phosphorus oxydichloride (9.75 gm.), phosphorus oxychloride (0.83 gm.), dissolved in methylene chloride (50 ml.).

Additional bisphenol A (114 gm.), triethylamine (175 ml.) and methylene chloride (650 ml.) were added to the previously formed solution. Phosgene (55 gm.) was then added, and a viscous solution was formed. Methylene chloride (200 ml.) was then added. The resulting polymer product was recovered as previously described.

The product had a melting point of about 220°–230° C. and an inherent viscosity of 0.66.

EXAMPLE 14

This Example illustrates some of the pertinent physical properties for the random copolymers of Examples 10 and 12 and the block copolymers of Examples 11 and 13. Standard test procedures were employed.

| | Tensile Str. | |
|---|---|---|
| Example No. | Yield (kg./cm.$^2$) | Break (kg./cm.$^2$) |
| 10 | 660.9 | 478.1 |
| 11 | 679.9 | 437.3 |
| 12 | 703.1 | 590.6 |
| 13 | B/Y | 575.8 |

| | Elongation | | |
|---|---|---|---|
| Example No. | Yield (%) | Break (%) | Tensile Impact (Newton-meter/cm.$^2$) |
| 10 | 12 | 53 | 22.27 |
| 11 | 12 | 16 | 2.31 |
| 12 | 13 | 98 | 24.37 |
| 13 | B/Y | 5 | 2.10 |

| Example No. | Flexural Modulus (kg./cm.$^2$ × 10$^{-4}$) | DTL (°C.) | UL-94 |
|---|---|---|---|
| 10 | 2.32 | 126.5 | V-O |
| 11 | 2.60 | 124 | V-O |
| 12 | 2.36 | 140 | V-O |
| 13 | 2.46 | 140 | V-O |

EXAMPLE 15

This Example sets forth a series of runs using differing amounts of differing chain branching agents including phosphorus oxychloride (POCl$_3$), phloroglucinol (abbreviated "PHOL") and pyrogallol (abbreviated "PYOL").

The basic reaction was conducted as follows:

Bisphenol A (34.2 gm.), triethylamine (35 gm.) and methylene chloride (200–240 ml.) were placed in a 500 ml. round bottom flask. To this was added benzene phosphorus oxydichloride (2.74 gm.) in 5 ml. of methylene chloride and the chain branching agent, as listed in the Table given below. Phosgene (15 gm.) was then added over a period of 30 minutes to obtain a viscous polymer solution, and the product was recovered as previously described. The results were as follows:

| Run No. | Chain Branching Monomer | | Product Inherent Visc.$^2$ | Melt. Pt. (°C.) |
|---|---|---|---|---|
| | Name | Conc$^1$ | | |
| 1 (control) | None | None | 0.50 | 200–205 |
| 2 | POCl$_3$ | 0.3 | 0.58 | 220–225 |
| 3 | POCl$_3$ | 0.5 | 0.65 | 220–225 |
| 4 | POCl$_3$ | 1.4 | 0.72 | 220–225 |
| 5 | POCl$_3$ | 2.2 | Gelation | |
| 6 | POCl$_3$ | 5.0 | Gelation | |
| 7 | PHOL | 0.5 | 0.67 | 220–225 |
| 8 | PHOL | 1.2 | 0.72 | 220–225 |
| 9 | PHOL | 1.8 | Gelation | |
| 10 | PYOL | 1.2 | 0.55 | 200–205 |

$^1$the concentration is mole % based on the amount of bisphenol.
$^2$determined at 1.0 wt. % in a 60/40 weight mixture of phenol and tetrachloroethane at 30° C.

EXAMPLE 16

This Example illustrates the effect of a monophenol chain terminator on the gelation characteristics of a copolymer of the present invention when a high concentration of branching agent is used.

The basic reaction was conducted as follows:

Bisphenol A (34.2 gm.), triethylamine (35 gm.) and methylene chloride (200–240 ml.) were placed in a 500 ml. round bottom flask. To this was added a mixture of benzene phosphorus oxydichloride (2.74 gm.) and an appropriate amount of phosphorus oxychloride (POCl₃) in 5 ml. of methylene chloride. An appropriate amount of p-tert-butyl phenol (abbreviated "PTBP" in the Table given below) chain terminator in 5 ml. of methylene chloride was then added. Phosgene (15 gm.) was then added over a 30 minute period to obtain a viscous polymer solution. The product was recovered as previously described.

The results are set forth in the Table which follows. Run Nos. 1, 2 and 5 show the results obtained when the POCl₃ and chain terminator are both absent (Run No. 1) and when just the chain terminator is absent (Run Nos. 2 and 5).

| Run No. | POCl₃ (mole %)* | PTBP (mole %)* | Inherent Viscosity** |
|---|---|---|---|
| 1 | 0 | 0 | 0.50 |
| 2 | 2.2 | 0 | Gelation |
| 3 | 2.2 | 2.0 | 0.56 |
| 4 | 2.2 | 4.0 | 0.37 |
| 5 | 5.0 | 0 | Gelation |
| 6 | 5.0 | 5.0 | 0.48 |

*based on the molar amount of bisphenol A
**determined as 1 wt. % in 60/40 phenol/tetrachloroethane at 30° C.

The above data indicate that the amount of phosphorus oxychloride can be increased in the polymers without gelation by use of an appropriate amount of a chain terminator, e.g., p-tert-butylphenol.

EXAMPLE 17

This Example illustrates the effect that the bisphenol monomer charge has on the glass transition temperature (Tg) of the copolymers of the present invention.

The basic polymerization reaction which was used is as follows:

A mixture (total weight=0.074 mole) of bisphenol A and tetrachlorobisphenol A, triethylamine (30 ml.) and methylene chloride (150 ml.) were placed in a 500 ml. round bottom flask. To this mixture was added benzene phosphorus oxydichloride (3.0 gm.) in 5 ml. of methylene chloride, and phosgene (7.0 gm.) was added over a 20 minute period to produce a viscous polymer solution. The polymer product was recovered as previously described.

The Table set forth below gives the glass transition temperature (Tg) and inherent viscosity (determined as described in Example 16) for a series of bisphenol A/tetrachlorobisphenol-A polymers (Run Nos. 2–4) as compared to polymers containing only moieties derived from bisphenol A (abbreviated "BPA") only (Run No. 1) and tetrachlorobisphenol A (abbreviated "TCBPA") only (Run No. 5) as the bisphenol reactant.

| Run No. | BPA/TCBPA (mole %) | Tg (°C.) | Inherent Viscosity |
|---|---|---|---|
| 1 | 100/0 | 132 | 0.55 |
| 2 | 80/20 | 145 | 0.32 |
| 3 | 75/25 | 162 | 0.42 |
| 4 | 50/50 | 164 | 0.32 |
| 5 | 0/100 | 200 | 0.42 |

These data illustrate the increase in Tg of the polymer as the proportion of tetrachlorobisphenol A is increased in the copolymer.

EXAMPLE 18

This Example illustrates a procedure for forming the copoly(carbonate/phosphonate) compositions of the present invention wherein the phosgene, organophosphorus dihalide, and chain branching agent are simultaneously added to the bisphenol-containing mixture.

Bisphenol A (28.7 gm.), tetrachlorobisphenol A (5.0 gm.), p-tert-butylphenol (0.35 gm.), methylene chloride (200 ml.) and triethylamine (53 ml.) were added to a reaction flask. With stirring, phosgene was introduced to the previously described mixture through a gas inlet tube. At the same time, a mixture of benzene phosphorus oxydichloride (3.0 gm.) and phosphorus oxychloride (0.2 gm.) in methylene chloride (30 ml.) was added to the mixture through an addition funnel over a 65 minute period. The addition of the benzene phosphorus oxydichloride-containing mixture was terminated when about 80% of the theoretical amount (14 gm.) of phosgene had been added. At this point, the addition rate of phosgene was reduced. A total of about 20 gm. of phosgene was added over a 150 minuite period to obtain a viscous polymer solution. The solution was washed and the polymer product was recovered as described in previous Examples.

The product had a melting point of about 210°–230° C. and an inherent viscosity of 0.57.

The foregoing Examples illustrate certain embodiments of the present invention and should not be construed in a limiting sense. The scope of protection that is desired is set forth in the appended claims.

What is claimed:

1. In a copoly(carbonate/phosphonate) composition formed by the reaction of: (1) at least one dihydric phenol; (2) at least one carbonate precursor; and (3) at least one organophosphorus dihalide, wherein the improvement consists essentially of the presence of an effective amount of a chain branching agent to increase the melting point and inherent viscosity of said composition.

2. A composition as claimed in claim 1 wherein the chain branching agent is a trifunctional phosphorus compound.

3. A composition as claimed in claim 1 wherein the chain branching agent has a formula selected from the group consisting of P(O)X₃, P(S)X₃ and PX₃, where X is selected from the group consisting of chlorine and bromine.

4. A composition as claimed in claim 3 wherein the chain branching agent is phosphorus oxychloride.

5. A composition as claimed in claim 1 wherein the chain branching agent has the formula

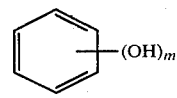

where m is an integer ranging from 3 to 6.

6. A composition as claimed in claim 1 wherein the amount of chain branching agent ranges from about 0.1 mole % to about 5 mole %, based on the molar amount of phenol.

7. A composition as claimed in claim 1 which further consists essentially of an effective amount of a chain terminating agent to prevent gelation.

8. A composition as claimed in claim 5 wherein the chain branching agent is phloroglucinol.

9. A composition as claimed in claim 5 wherein the chain branching agent is pyrogallol.

10. A composition as claimed in claim 7 wherein the amount of chain terminating agent ranges from about 0.5 mole % to about 10 mole %.

11. A composition as claimed in claim 7 wherein the chain terminating agent is selected from the group consisting of the monohydroxy alkyl and aryl chain terminators.

12. A composition as claimed in claim 1 wherein the chain branching agent is of the general formula

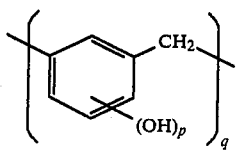

where p is an integer of from 1 to 4 and q is an integer of from 2 to 8.

* * * * *

UNITED STATES PATENT AND TRADEMARK OFFICE
CERTIFICATE OF CORRECTION

PATENT NO. : 4,223,104
DATED : September 16, 1980
INVENTOR(S) : Ki-Soo Kim et al.

It is certified that error appears in the above-identified patent and that said Letters Patent are hereby corrected as shown below:

Col. 2, line 33, "carbonate precursor" should be -- carbonate precursors --;

Col. 6, line 45, in the Table in Example 9, the tensile strength at break for the product from Example No. 7 should be -- 217.96- rather than "217.69";

Col. 9, line 60, "("TCBPA)" should read -- ("TCBPA)) --; and

Col. 10, line 31, "minuite" should read -- minute --.

Signed and Sealed this

Thirteenth Day of January 1981

[SEAL]

Attest:

SIDNEY A. DIAMOND

Attesting Officer

Commissioner of Patents and Trademarks